United States Patent Office 2,884,058
Patented Apr. 28, 1959

2,884,058

CELLULOSE WEB OF IMPROVED DRY STRENGTH CONTAINING A POLYMER COMPRISING CARBOXYLIC GROUPS, AMIDE GROUPS, AND QUATERNARY AMMONIUM GROUPS AND METHOD FOR PRODUCING SAME

Walter H. Schuller, Stamford, Walter M. Thomas, Darien, Sewell T. Moore, Stamford, and Ronald R. House, Darien, Conn., assignors to American Cyanamid Company, New York, N.Y., a corporation of Maine No Drawing. Application May 2, 1955
Serial No. 505,567

6 Claims. (Cl. 162—168)

The present invention relates to the manufacture of cellulose webs of improved dry strength resulting from the presence therein of an amphoteric polymer. More particularly the present invention relates to a method for producing cellulosic webs (including paper) of improved dry strength by a process which contains the step of adsorbing or depositing on cellulose fibers a small amount of linear carbon chain polymer containing amide, carboxylic and quarternary ammonium groups. Such polymers are amphoteric.

Canadian Patent No. 477,265 issued on September 25, 1951, to J. L. Azorlosa discloses that paper of greatly increased dry strength is produced when the anionic resin formed by copolymerizing acrylamide with acrylic acid is added to a beater pulp and the resin is precipitated on the fibers by addition of alum. It is an important advantage that the resulting paper possesses only negligible wet strength, making it possible to repulp broke and scrap without difficulty. Wide commercial interest has been aroused by this process.

It is a disadvantage of the process that its optimum employment requires the pH of the pulp during adsorption of the polymer to be maintained at a value rather close to 4.7. Numerous laboratory trials have shown that the strengthening effect imparted by the resin falls off where lower or higher pH values are employed, and zero improvement is obtained at about pH 4 on the one hand, and about pH 9 on the other. This is decidedly unfortunate as it is difficult to control pH values within a fraction of a pH unit in commercial operations.

The process has a second disadvantage in that the pH of 4.7 is distinctly acid and has a corrosive effect upon the equipment, particularly the wire. While this corrosion can be obviated by adding a neutralizing agent to the pulp, this prevents the water from being re-used for make-up purposes without reacidification. Alternate acidification and neutralization are costly, and moreover cause a steady increase in the salt content of the water thus reducing the number of times it can be recirculated.

The discovery has now been made that the papermaking operation can be run throughout at an elevated pH (i.e., at a pH above 4.7) when there is employed a water-soluble dry strength linear carbon chain polymer containing carboxyl groups, amide groups and quaternary ammonium groups. The evidence is that in each instance the quaternary ammonium groups raise the optimum adsorption pH which the resin would otherwise possess, and it has even been possible to manufacture paper of very satisfactory dry-strength while running the process at an alkaline pH throughout. The resins referred to are amphoteric, and because of their content of anionic (carboxyl) and cationic (quaternary ammonium) substituents have both acid and basic properties. The paper possesses only negligible wet strength and thus retains the principal advantages of the paper produced according to the Azorlosa patent.

The evidence is that the polymer need contain only about one quaternary ammonium group per macromolecule to increase the optimum adsorption pH of the polymer to about 5.0. The number of quaternary ammonium groups need be very small compared to the other groups, and our results indicate the optimum adsorption pH is well in excess of 5.0 where the ratio of the number of quaternary ammonium groups to the total number of carboxylic and amide groups is 0.1:99.9, or more. From this it will be apparent that the quaternary ammonium groups (which ordinarily are the most costly component of the polymer) need be present in no greater proportion than that necessary to confer optimum adsorption within the alkaline, neutral or at most mildly acid papermaking range, that is the range of pH 5–10, together with water-solubility and cationic properties. Useful results have been obtained when the ratio of quaternary radicals to the total number of carboxylic and amide radicals has been as high as 20:80 but larger amounts are unnecessary.

The quaternary ammonium groups are powerful solubilizing groups and thus somewhat fewer carboxylic groups need be present as compared with the number indicated by the Azorlosa patent. According to the invention the ratio of carboxylic to amide groups may be as low as about 0.1:99.9. The ratio should not be in excess of 25:75, as in this event the dry strength of the paper falls off without attendant benefit.

In the polymer the ratio of the total number of carboxylic, amide and quarternary ammonium groups to the total number of linear carbon atoms forming the chain should be at least about 1:4. When the ratio is lower, the strengthening effect imparted by the polymer tends to fall off excessively due to dilution effect. By the use of polyfunctional monomers such as betaines the ratio may be 4:4 or higher up to perhaps 8:4, the betaines contributing two groups per monomer unit. However, preparation of carbon chains carrying substituents in ratio higher than 3:4 and especially 8:4 is more costly without conferring any major offsetting advantage. When the polymer is formed by interpolymerization of monofunctional materials such as acrylic acid, acrylamide, and an acrylic quaternary ammonium compounds, the ratio is about 2:4 which has given very good results and is therefore preferred.

According to the invention cellulosic webs are manufactured by forming a pulp of hydrated cellulose fibers in the usual way, adding a small amount of the above-described polymer, adsorbing the polymer on the fibers, and sheeting and drying the fibers at a convenient temperature.

Because of its amphoteric nature the polymer possesses cationic properties, so that in most instances the polymer is at least moderately cellulose-substantive and no precipitant need be added. The polymer, however, possesses anionic properties as well, and hence in most instances better dry strength results when adsorption is assisted by addition of alum or other suitable polyvalent metal salt.

Best strengthening usually occurs when the alum is added first. It is believed that at least part of the alum is directly adsorbed by the fibers, resulting in closer association of the polymer with the fiber than would otherwise be the case. Good results, however, have been obtained when the polymer is added first followed by the alum. The evidence is that the alum, when added first, acts as a mordant combining with the carboxylic groups, and that it should be possible to perform the mordanting as a separate step making subsequent addition of alum unnecessary.

Adsorption of the polymer occurred within a few minutes and sometimes even within a few seconds in the presence or absence of alum, so that aging is not necessary in usual mill practice as a separate step.

As stated above each resin appears to have one pH at which it is best adsorbed and may have a secondary pH adsorption maximum. The precise pH in each instance appears to depend primarily on the particular substituents attached to the quaternary ammonium atoms, the proportion of quaternary ammonium groups to the carboxylic groups present, and the extent to which the quaternary nitrogen atoms are masked by the groups attached thereto or by adjacent groups in the chain. The optimum pH also appears to vary slightly with the particular pulp employed. As a result, the optimum pH for each resin is most conveniently found by laboratory trial.

A strengthening effect is noted when as little as 0.05% of polymer is adsorbed based on the dry weight of the fibers and thus still less is evidently capable of producing some beneficial results. Commercially useful strengthening usually requires at least about 0.1% of the resin. The dry strength of the paper increases as more resin is present up to roughly 10% of the weight of the fibers. However, the strengthening effect per increment of resin adsorbed falls off above about 3%. The practical range is therefore 0.1% to about 3% of resin based on the dry weight of the fibers.

Where the polymer is a thermoplastic resin (i.e. a resin not capable of further polymerization on the fibers), the drying temperature and time need be no more than that sufficient to furnish apparently dry paper. Where, however, the polymer is thermosetting (by reason of a content of combined formaldehyde or other heat-reactive radical), the paper should be maintained at a polymerization temperature in the range of about 160°–260° F. for about ½ to 3 minutes so as to complete development of the bonding properties of the resin.

The process of the present invention contemplates that the polymer will be added after the pulp has been adjusted to the pH at which it is best adsorbed. For this purpose customary means may be employed such as alum in conjunction with sodium hydroxide, or sodium aluminate with or without alum or sodium hydroxide, lime, etc.

Polymers of the present invention may be readily prepared by known means. One method is disclosed in the Canadian patent referred to. Another method is to copolymerize acrylamide in anhydrous medium with a quaternary ammonium compound copolymerizable therewith, and subject the resulting polymer to hydrolysis conditions so as to convert sufficient of the amide groups to carboxyl groups. The polymer may also be formed by interpolymerization of monomers, and in this event care should be taken to ensure that each of the components of the starting monomeric mixture enters into the reaction at substantially the same rate, so that the polymeric macromolecules have substantially the same composition and each is composed of the monomeric units in regularly-recurring combined form. Where the polymerization is performed in aqueous medium, regard should be had to the hydrolysis of acrylamide groups which normally occurs. This amount of hydrolysis may be determined by known means including titrations.

A preferred method for the preparation of such polymers is disclosed in copending application Serial No. 505,514 filed herewith by W. H. Schuller and W. M. Thomas. According to this procedure acrylamide and a compound of the type of diallyldimethyl ammonium chloride is interpolymerized in aqueous solution at 40°–50° C. using ammonium persulfate and potassium metabisulfite as catalysts. Moreover, corresponding betaines may be used such as those of the formula $$(CH_2=CH-CH_2)_2N^+CH_3 \cdot COO^-$$

as shown in copending applications Serial No. 504,352 filed on April 27, 1955, by W. H. Schuller et al.

Commercial monomeric acrylamide generally contains about ½% to 5% by weight of acrylic acid and therefore in most instances it is unnecessary to add any constituent supplying carboxyl radicals. If desired, however, appropriate amounts of acids contributing carboxyl groups, amide groups or both such as maleic acid, maleamic acid, p-vinylbenzoic acid, methacrylic acid, citraconic acid, and citraconamic acid may be added.

The acrylamide may be replaced in whole or in part with materials such as methacrylamide and the lower N-alkyl and N-hydroxyalkyl acrylamides.

The quaternary component may be supplied in at least three ways. According to one method a material such as p-(chloromethyl)-styrene or allyl chloroacetate is interpolymerized with compounds supplying amide and carboxylic radicals, after which quaternization is effected by addition of a tertiary amine. For this purpose trimethylamine has been found suitable, as well as N-methylpyridine. If desired, the components may be reacted with p-(dimethylamino)-styrene, and the polymer thus obtained treated with a material such as methyl iodide or dimethyl sulfate to effect quaterization.

Thus, it is within the scope of the invention to employ such materials as trimethylvinylbenzyl ammonium chloride, the compound formed by quaternizing dimethyl aminopropylacrylamide with benzyl chloride, the compound formed by quaternizing ethyl diaminoacrylate with benzyl bromide, and dimethylallyldimethyl ammonium chloride.

We prefer to prepare the polymers by the method disclosed in application Serial No. 505,514 filed herewith by W. H. Schuller et al. The application discloses the particular utility as raw materials of compounds of the formula

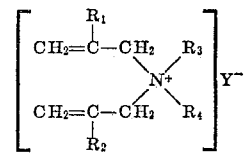

where $R_1$ and $R_2$ each represents a member of the class consisting of hydrogen, and methyl and ethyl radicals, $R_3$ and $R_4$ each represents a member of the class consisting of alkyl, hydroxyalkyl, and alkoxyalkyl radicals, and $Y^-$ represents an anion. Only one of the two allyl groups reacts, and the resulting polymer thus contains a substituted or unsubstituted monoallyl dimethyl ammonium radical. Radicals of this class have given excellent results and are therefore preferred.

The use of pure compounds is not required, and it is thus within the scope of the invention to add to the pulp a polymer prepared by interpolymerizing a mixture of compounds supplying amide groups with a mixture of compounds supplying carboxylic groups with a mixture of compounds supplying quaternary ammonium groups. Neither the particular polymer employed nor the particular method by which the polymer is prepared is a principal feature of the invention.

Polymers suitable for use in the present invention may carry substituents in addition to carboxylic, amide and quaternary ammonium groups, such as nitrile groups, ester groups, primary, secondary and tertiary amino groups, aryl, alkyl, aralkyl, alkaryl, etc. groups, heterocyclic groups, halogen, etc. From the point of view of dry strength imparted these groups act as spacers or diluents and impart little if any improvement. They may be introduced by adding small amounts of materials such as acrylonitrile, a lower alkyl acrylate, styrene, p-methylstyrene, p-chloromethylstyrene, allyl bromide, 2-vinylpyridine, 2-morpholineethylvinyl ether, etc.

The optimum adsorption pH for each polymer is most readily found by making a series of laboratory trials tests over the pH range 5–9 and comparing the dry strength obtained at each pH.

The invention will be more particularly illustrated by the examples which follow. The examples are specific embodiments and are not to be construed as limitations thereon.

*Example 1*

The following illustrates the improvement in dry-strength caused by the presence of quaternary ammonium radicals in an anionic dry-strength resin when the resin is applied at neutral and alkaline pH values, as well as at acid values as heretofore customary.

An anionic polymer was prepared by copolymerization of acrylamide and acrylic acid in 95:5 molar ratio. The acrylamide, however, contains 2% by weight of acrylic acid and moreover it is known that a small amount of hydrolysis occured during the copolymerization. The product thus contained amide and carboxylic groups in ratio of about 91:9.

An amphoteric tripolymer was prepared from acrylamide and acrylic acid in 95:5 molar ratio plus 1% diallyl dimethyl ammonium chloride based on the weight of the mixture. The two polymers thus were comparable except as regards their quaternary ammonium content.

The two polymers were diluted to 5% solids with water and tested on a comparative basis as follows:

A 60:40 bleached sulfite:soda pulp which has been beaten to a Green freeness of about 300 ml. was diluted to a consistency of 0.6% and aliquots were withdrawn. To each of the aliquots was added 2% of alum based on the dry weight of the fibers therein. The pH of the aliquots was adjusted to values shown in the table below.

Aliquots 1–6 were blanks, and these were sheeted without further treatment.

Aliquots 7–14 were controls, and were prepared by adding 0.25% of the anionic resin described above.

Aliquots 15–22 were test aliquots and were prepared in the same manner as the control aliquots except that the resin added was 0.25% based on the weight of the fibers of the amphoteric polymer described above.

The pulps were gently stirred for about five minutes, sheeted on a Nash handsheet machine and the sheets dried at a basis weight of about 47.5 lb. per 25" x 40"/500 ream, conditioned and tested according to standard laboratory practices. The dry and wet tensile strength of each of the sheets was determined in the long direction and short direction and the results averaged. In every instance the wet tensile strength was in the very low range of 0.5–1.5 lb. Results as to dry-strength are as follows:

| Run No. | Resin | pH | Dry Tensile Corrected [1] |
|---|---|---|---|
| 1 | Blank | 4.0 | 13.0 |
| 2 | do | 4.5 | 13.6 |
| 3 | do | 4.7 | 13.8 |
| 4 | do | 6.0 | 14.1 |
| 5 | do | 7.0 | 14.4 |
| 6 | do | 9.0 | 14.2 |
| 7 | Anionic | 3.9 | 13.6 |
| 8 | do | 4.5 | 17.1 |
| 9 | do | 4.7 | 16.9 |
| 10 | do | 5.0 | 16.5 |
| 11 | do | 6.0 | 15.6 |
| 12 | do | 7.0 | 15.1 |
| 13 | do | 8.0 | 14.8 |
| 14 | do | 9.0 | 14.4 |
| 15 | Amphoteric | 3.9 | 14.6 |
| 16 | do | 4.5 | 15.6 |
| 17 | do | 4.7 | 15.9 |
| 18 | do | 5.0 | 16.0 |
| 19 | do | 6.0 | 16.4 |
| 20 | do | 7.0 | 17.5 |
| 21 | do | 8.0 | 16.1 |
| 22 | do | 9.0 | 16.4 |

[1] Corrected to 47.5 lb. basis weight. Values shown are lbs. per inch.

The results show that in the case of the sheets containing the anionic polymer a rapid increase in dry-strength was obtained in going from pH 4.0 to pH 4.7, after which the dry-strength values steadily declined. At pH 7 the loss in tensile strength was about 10% and at pH 8.5 the loss was 15%.

In the case of the tests with the amphoteric polymer, the dry strength increased steadily up to about pH 7 and at that value yielded a paper which was slightly stronger than the paper afforded by the anionic polymer at pH 4.5 and which was about 13% better than the anionic polymer treated paper had been at pH 7. At pH 9 the strength of the paper containing the amphoteric resin was better than the paper containing the anionic resin by slightly more than 10%.

It will be noted that at pH 9 the strength of the paper containing the anionic resin was almost exactly the same as the blank which contained no resin at all. This showed that the anionic resin became substantially completely inactivated at pH 9.

*Example 2*

The following illustrates results obtained with and without alum using a preferred amphoteric resin adapted for commercial production by a copolymerization method. The polymer was prepared by copolymerizing 85 parts by weight of commercial acrylamide (containing about 2% by weight of acrylic acid) with 15 parts by weight of diallydimethyl ammonium chloride.

The resin was applied following the general method of Example 1. In runs 1–3 no alum was employed, and the amount of resin added was 1% of the weight of the fibers. In runs 4–6 2% of alum was added based on the weight of the fibers followed by 1% of the resin. Results are as follows:

| Run | pH | Percent Alum | Basis Weight [1] | Tensile Strength [2] |
|---|---|---|---|---|
| Control | 5.0 | None | 46.6 | 13.9 |
| 1 | 5.0 | None | 46.9 | 17.6 |
| 2 | 7.0 | None | 47.7 | 17.0 |
| 3 | 9.0 | None | 46.2 | 17.2 |
| 4 | 5.0 | 2 | 46.7 | 17.7 |
| 5 | 7.0 | 2 | 47.2 | 18.6 |
| 6 | 9.0 | 2 | 48.1 | 17.6 |

[1] 25" x 40"/500.
[2] Lb. per inch.

The data show two principal results. The first is that the strength of the paper was substantially independent of pH, the quaternary ammonium groups appearing to overcome the decrease in resin-to-fiber bonding which occurs when anionic dry-strength resins (i.e. resins of the acrylamide-acrylic acid copolymer type) are adsorbed at pH values above about 5. The second is that the introduction of a minor proportion of quaternary ammonium groups render anionic resins substantive to the fibers. The paper of runs 4–6 was only slightly stronger than the paper of runs 1–3.

From previous experience it is known that no dry-strength effect would have been obtained without addition of alum if the resin had contained no quaternary ammonium groups.

*Example 3*

The effect of combined formaldehyde in improving the dry strength of paper of the present invention is illustrated by the following:

A resin was prepared by mixing 80 gm. of acrylamide, 5 gm. of acrylic acid, 15 gm. of N-methyl-2-vinyl-pyridine, 400 cc. of water, and 0.5 gm. of ammonium persulfate. The mixture was heated at 80° C. for three hours and then cooled to room temperature.

Half of the product was removed and diluted with water to 5% solids preparatory to use for the manufacture of paper.

To the rest of the reaction product was added 31 gm. of paraformaldehyde (equivalent to two mols of formaldehyde per amide group present). The paraformaldehyde was reacted at pH 9 at the temperature of 40° C. for one hour. The product was adjusted to pH 7 and likewise diluted to 5% solids.

The products were tested according to Example 1 using 2% of alum and 1% of the resin in each instance, the pH of the pulp during adsorption being 6.5. The handsheets were dried at 240° F. for two minutes. The paper containing the first resin had a dry tensile strength of about 17 lbs. per inch, while the paper containing the second resin had a dry tensile strength of 18.5 lbs. per inch.

*Example 4*

The following illustrates the manufacture of dry-strength paper by the tub sizing method.

A tub sizing solution was prepared by forming a 2% aqueous solution of the polymer of Example 2 and adjusting the pH of the solution to 6.

A number of unbleached kraft hand sheets containing 2% of rosin size precipitated by 3% of alum (based on the dry weight of the fibers) were dipped into the polymer solution and drum dried at 240° F. The alum retained by the fibers after deposition of the rosin caused extensive pickup and adsorption of polymer. Well-sized paper of improved dry-strength was thereby obtained.

*Example 5*

The following illustrates the manufacture of well-sized paper having an alkaline pH according to the present invention. In this embodiment the pH of the papermaking cycle was alkaline during addition of the dry strength polymer.

An aqueous suspension was prepared from unbleached northern kraft pulp previously beaten to a Green freeness of about 550 ml. To this was added 2% of the epichlorohydrin-octadecylamine alkali resistant size of U.S. Patent No. 2,694,629 (prepared by condensing one mol of octadecylamine hydrochloride with two mols of epichlorohydrin at 65° C., dispersing the product in boiling water, homogenizing, and rapidly chilling). There was then added 2% of sodium aluminate to the pulp and after five minutes of gentle stirring (during which the pH of the pulp was adjusted to 7.5) 0.5% of the dry strength quaternary ammonium polymer of Example 2, all weights being based on the dry weight of the fiber. The pulp was diluted to 0.6% and slowly circulated in the beater for five minutes. The pulp was sheeted on a Nash handsheet machine and the sheets after pressing between blotters were dried at 240° F. for two minutes on a Noble and Wood drier. Sheets having good dry strength and sizing were obtained which had a neutral pH.

We claim:

1. A method of manufacturing a cellulosic web of improved dry strength, which comprises: forming an aqueous suspension of cellulosic fibers, adsorbing on said fibers while in said suspension from about 0.05% to 10% (based on their dry weight) of a water-soluble linear carbon chain polymer containing carboxylic groups, amide groups, and quaternary ammonium groups; the ratio of the number of quaternary ammonium groups to the total number of carboxylic groups and amide groups being between about 0.1:99.9 and 20:80, the ratio of the number of carboxylic groups to the number of amide groups being between about 0.1:99.9 and 25:75, sheeting said suspension to form a waterlaid web, and drying said web.

2. A process according to claim 1 wherein the fibers have been mordanted with alum prior to adsorption thereon of the linear carbon chain polymer.

3. A process according to claim 1 wherein the pH of the aqueous suspension is above 7 during adsorption of said polymer on said fibers.

4. A process according to claim 1 wherein the weight of the polymer is between 0.5% and 3% of the dry weight of the fibers.

5. A process according to claim 1 wherein the amide groups are hydroxymethyl amide groups thereby rendering the polymer thermosetting.

6. A cellulose web, the fibers of which have adsorbed thereon from about 0.05% to 10%, based on their dry weight, of a water-soluble linear carbon chain polymer containing carboxylic groups, amide groups, and quaternary ammonium groups; the ratio of the number of quaternary ammonium groups to the total number of carboxylic groups and amide groups being between about 0.1:99.9 and 20:80, and the ratio of the number of carboxylic groups to the number of amide groups being between about 0.1:99.9 and 25:75; said web being prepared by the process of claim 1.

References Cited in the file of this patent

UNITED STATES PATENTS

| | | |
|---|---|---|
| 2,433,802 | West | Dec. 30, 1947 |
| 2,559,220 | Maxwell et al. | July 3, 1951 |
| 2,654,729 | Price | Oct. 6, 1953 |
| 2,727,016 | Hankins | Dec. 13, 1955 |

FOREIGN PATENTS

| | | |
|---|---|---|
| 477,265 | Canada | Sept. 26, 1951 |
| 154,799 | Australia | Jan. 19, 1954 |